United States Patent [19]
Stauffer

[11] Patent Number: 5,735,074
[45] Date of Patent: Apr. 7, 1998

[54] APPARATUS AND METHOD FOR CASTING FLEXIBLE LINE

[76] Inventor: Russell T. Stauffer, 625 E. Villager La., Midvale, Utah 84047

[21] Appl. No.: 551,570

[22] Filed: Nov. 1, 1995

[51] Int. Cl.$^6$ ............................................. A01K 91/02
[52] U.S. Cl. ......................... 43/19; 124/16; 124/41.1
[58] Field of Search .......................... 43/19; 124/16, 124/41.1; 273/129 S, 129 T

[56] References Cited

U.S. PATENT DOCUMENTS

| | | |
|---|---|---|
| 1,054,916 | 3/1913 | Gray . |
| 2,217,820 | 10/1940 | Rowe ........................................ 43/19 |
| 2,225,719 | 12/1940 | Shotton ..................................... 43/19 |
| 2,533,659 | 12/1950 | Yates ....................................... 124/16 |
| 2,849,824 | 9/1958 | McGee ...................................... 43/19 |
| 2,873,547 | 2/1959 | Coelho ...................................... 43/19 |
| 2,932,111 | 4/1960 | Kremski et al. ............................ 43/19 |
| 3,026,644 | 3/1962 | Raider ....................................... 43/19 |
| 3,217,442 | 11/1965 | Nygren . |
| 3,255,548 | 6/1966 | Whritenour . |
| 3,279,115 | 10/1966 | Worsham .................................. 43/19 |
| 3,344,547 | 10/1967 | Schroeder et al. . |
| 3,365,834 | 1/1968 | Kreft ........................................ 43/19 |
| 3,400,480 | 9/1968 | Worsham . |
| 3,416,256 | 12/1968 | Blocker ..................................... 43/19 |
| 3,419,991 | 1/1969 | Mitchell . |
| 3,579,896 | 5/1971 | Flottorp .................................... 43/19 |
| 4,040,198 | 8/1977 | Skibo . |
| 4,501,085 | 2/1985 | Barnes . |
| 4,631,852 | 12/1986 | Whritenour . |
| 4,682,437 | 7/1987 | Akerberg . |

*Primary Examiner*—Joseph J. Hail, III
*Assistant Examiner*—Darren Ark
*Attorney, Agent, or Firm*—Thorpe, North & Western, L.L.P.

[57] ABSTRACT

A casting apparatus for casting a flexible line such as fishing line. First and second elongate hollow tubes having open ends are disposed with the open end of one of the tubes extending telescopically into the open end of the other tube. An open container is disposed on the second hollow tube for holding the end of the flexible line therein. A spring member resides within the tubes and extends through telescopically overlapping sections of the tubes. A user inserts the end of a fishing line into the open container with a lure or bait attached to the end of the line, pulls the second tube backwardly against the spring member and releases the second tube, thereby permitting the spring member to thrust and second tube forwardly and launch the end of the line through the air.

24 Claims, 2 Drawing Sheets

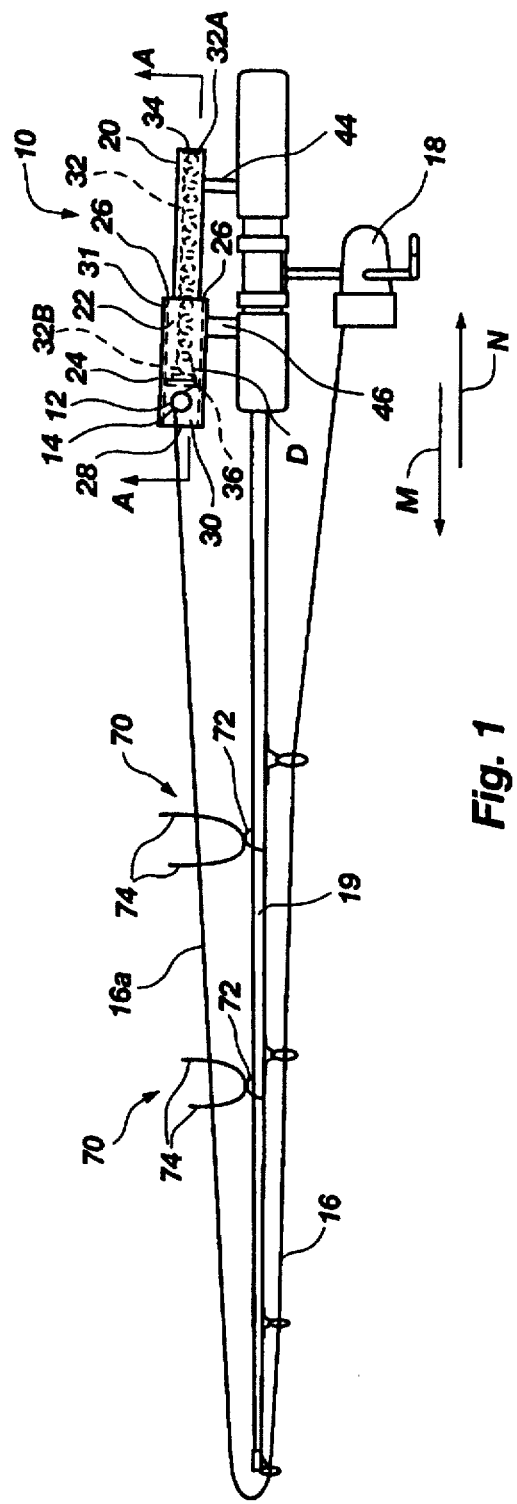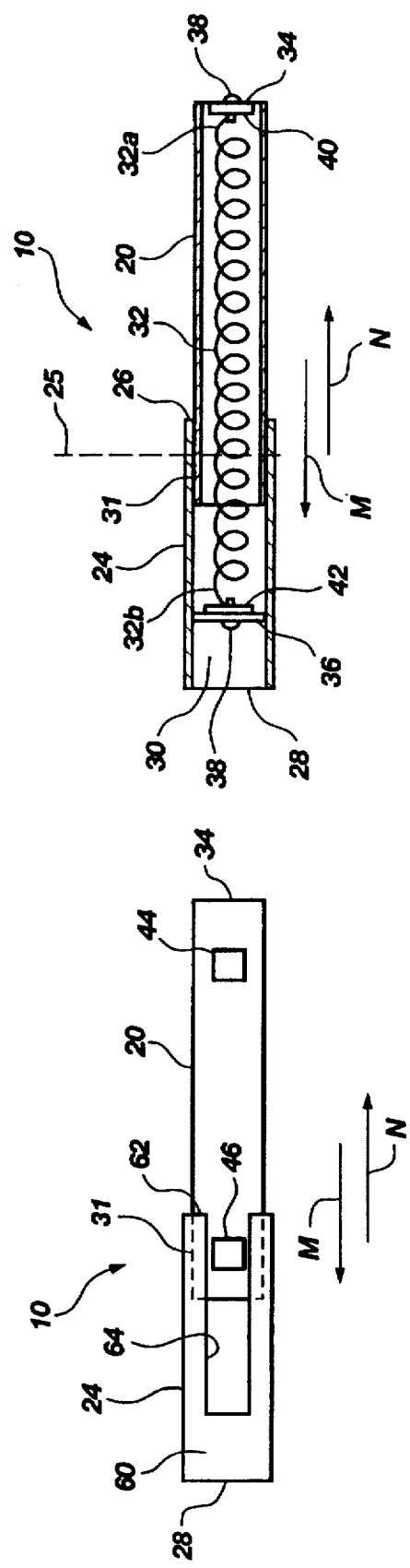

APPARATUS AND METHOD FOR CASTING FLEXIBLE LINE

BACKGROUND OF THE INVENTION

1. The Field of the Invention

The present invention relates generally to an apparatus for casting flexible line. More particularly, it concerns an apparatus and method for launching through the air a fishing lure or bait attached to a fishing line.

2. The Background Art

It is common practice to attach lures or bait to the end of a fishing line and cast the line through the air into a river or lake. Fishers generally cast the line by using a fishing rod and reel as known in the field. The user grasps the base end of the rod; releases a lock upon the line, and snaps the fishing rod forwardly with a flick of the wrist so that the lure or bait is launched into the water, carrying the fishing line. Unfortunately, inexperienced fishers will often cast the line too high or too low so that the bait does not go far enough out into the river or lake, or the line will be cast so hard that the bait is jarred from a fishing hook.

Attempts have been made to solve such problems by utilizing a line casting device attached to the fishing rod. For example, U.S. Pat. Nos. 3,400,480 (issued Sep. 10, 1968 to Worsham), 4,040,198 (issued Aug. 9, 1987 to Skibo), 1,054,916 (issued Mar. 4, 1913 to Gray), and 3,344,547 (issued Oct. 3, 1967, to Schroeder et al.) disclose various bait casting implements which can be aimed more accurately by the user, thus eliminating the need to practice line casting by flicking the wrist. However, the devices disclosed in these patents, while useful; are characterized by a number of disadvantages.

For example, the casting device disclosed in the Worsham patent is rather long and bulky because the spring member extends within only one of the telescopically disposed tube members of the fishing rod. The Skibo patent fails to take advantage of telescopic members and utilizes a flexible band which imposes an eccentrically applied force to the bait container, which over time may cause jamming or binding of the launching mechanism. The Grey patent discloses a casting device which exposes the lure or bait to frictional engagement with the sides of the launching container. The Shroeder et al. patent teaches a catapult-type casting device which is difficult to aim and fails to offer protection to the lure or bait in the form of an enclosed launching container. Further, some of the patents mentioned above disclose devices which require an abundance of gadgetry and parts which increases the chances for mechanical breakdown.

OBJECTS AND SUMMARY OF THE INVENTION

It is therefore an object of the present invention to provide a casting apparatus which is simple in design and manufacture.

It is another object of the invention to provide such a casting apparatus which is easier to use.

It is a further object of the invention to provide such a casting apparatus which is smaller and more compact.

It is an additional object of the invention to provide such a casting apparatus which requires fewer gadgetry and moving parts.

It is still another object of the invention to provide such a casting apparatus which does not expose any contained lures or bait to frictional engagement.

It is yet another object of the invention to provide such a casting device which is easier to aim.

The above objects and others not specifically recited are realized in a specific illustrative embodiment of a casting apparatus for casting a flexible line such as fishing line. First and second elongate hollow tubes having open ends are disposed with the open end of one of the tubes extending telescopically into the open end of the other tube. An open container is disposed on the second hollow tube for holding the end of the flexible line therein. A spring member resides within the tubes and extends through telescopically overlapping sections of the tubes. A user inserts the end of a fishing line into the open container with a lure or bait attached to the end of the line, pulls the second tube backwardly against the spring member and releases the second tube, thereby permitting the spring member to thrust the second tube forwardly and launch the end of the line through the air.

Additional objects and advantages of the invention will be set forth in the description which follows, and in part will be apparent from the description, or may be learned by the practice of the invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which:

FIG. 1 is a side view of a casting apparatus made in accordance with the principles of the present invention, shown in conjunction with a fishing rod;

FIG. 2 is a bottom view of the casting apparatus of FIG. 1;

FIG. 3 is a cross-sectional view of the casting apparatus of FIG. 1 taken along section A—A;

DETAILED DESCRIPTION OF PRESENTLY PREFERRED EMBODIMENTS

Figure 4:
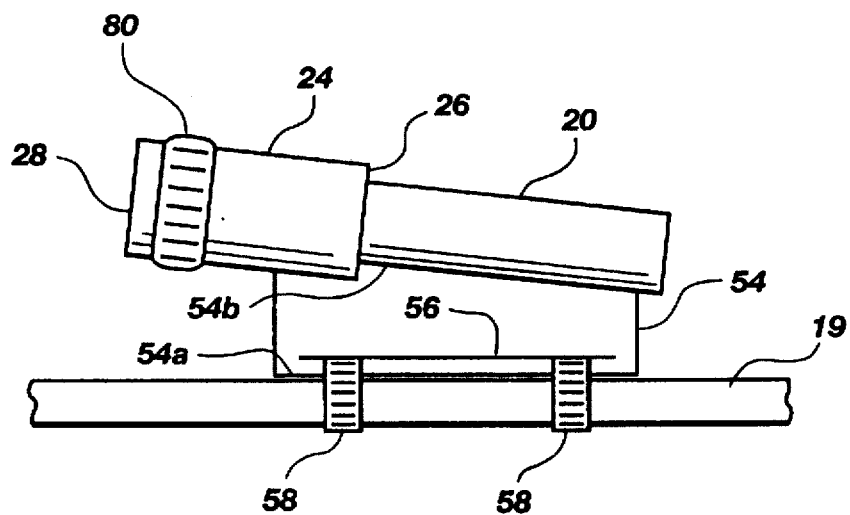
FIG. 4 is a side view of an alternative embodiment of the casting apparatus of FIG. 1.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the illustrated apparatus, and any additional applications of the principles of the invention as illustrated herein, which would normally occur to one skilled in the relevant art and possessed of this disclosure, are to be considered within the scope of the invention claimed.

Referring now to FIGS. 1–3, there is shown a casting apparatus, generally designated at 10, for casting a flexible line, such as fishing line 16, wherein the flexible line is disposed in a line feeding source such a fishing reel 18 and rod 19. A lure or bait 12 is typically secured at an end 14 of the fishing line 16. The apparatus 10 includes a first elongate hollow member 20 having an open distal end 22, and a second elongate hollow member 24 having an open proximal end 26. The open end of one of the hollow members is telescopically disposed within the open end of the other of said hollow members such that said hollow ends comprise telescopically overlapping sections 31. The second hollow member 24 is telescopically slidable relative to the first hollow members 20 forwardly and backwardly, respectively, as indicated at arrows M and N, respectively.

An open container 30 is disposed on the second hollow member 24 for holding the end 14 of the flexible line 16 therein. Preferably, the second hollow member 24 and the open container 30 collectively comprise a hollow outer tube having an open proximal end 26 and a second open end 28 separated by an internal dividing wall 36, as shown in FIGS. 1 and 3. The first hollow member 20 preferably comprises a hollow inner tube telescopically disposed within the open proximal end 26 of the outer tube 24 such that said inner and outer tubes are slidable relative to one another. A spring force means, such as spring member 32, extends through the telescopically overlapping sections 31 of the hollow members 20, 24 for thrusting the second hollow member 24 forwardly in the direction of arrow M and launching the end 14 of the flexible 16 line from the open container 30. Referring to FIG. 3, the spring member 32 is preferably disposed in substantial coaxial alignment within the first and second hollow members 20 and 24, such that at least of portion of each of the spring member and first and second hollow members project simultaneously through a single plane 25 extending laterally through the hollow members.

The concept that a spring force means, such as spring member 32 "extends through the telescopically overlapping sections 31", as used herein, shall be interpreted broadly to mean that the spring force means extends axially inside at least one of the telescopically overlapping sections, in that the spring force means may extend inside both of the sections as in FIGS. 1–3 or between the sections so as to axially circumscribe one of them. For example, as shown most clearly in FIG. 3, the spring member 32 extends axially inside both the telescopically overlapping sections 31. However, if desired, the apparatus 10 could be designed such that the spring member 32 slidably and axially circumscribes the first hollow member 20, such that the second hollow member 24 in turn axially circumscribes both the spring member 32 and the first hollow member 20.

In use, a user simply places the lure or bait 12 at the end of the line 14 into the open container 30, pulls the second hollow member 24 backwardly against the spring member 32 in the direction indicated at arrow N, and releases the second hollow member 24. The spring member 32 thrusts the second hollow member 24 forwardly in the direction indicated at arrow M with enough force to impart kinetic energy to the lure or bait 12 so as to launch the lure or bait through the air.

The principles of the present invention include a number of additional features and embodiments. The first and second hollow members 20 and 24 include first and second end walls 34 and 36, respectively. A first end 32a of the spring member 32 extends into the first hollow member 20 into attachment with the first end wall 34, and an opposing second end 32b extends into the second hollow member 24 into attachment with the second end wall 36, in any suitable manner. For example, referring to FIG. 3, the first end 32a of the spring member 32 may be secured to a first plate 40 which is in turn secured to the first end wall 34, and the second end 32b of the spring member may be secured to a second plate 42 which is in turn secured to the second end wall 36. The spring member 32 becomes compressed when the outer tube 24 is forced backwardly toward the inner tube 20 in the direction indicated at arrow N. When the outer tube 24 is released, the lure or bait 12 is launched through the air.

Screw members 38 may be utilized as shown, to form spring coupling means in combination with the plates 40 and 42 for releasably attaching the first and second ends 32a–b of the spring member 32 to the first and second end walls 34 and 36, respectively, so as to enable the spring member 32 to be interchangeable with other spring members.

The spring force means in the form of spring member 32 preferably performs the dual roles of propelling and stopping the outer tube 24 in a sufficiently rapid sequence to launch the lure or bait 12 through the air. The apparatus 10 preferably includes positioning means for positioning the first and second hollow members 20 and 24 at a lateral location relative to the line feeding source reel 18 and rod 19.

Figure 5:
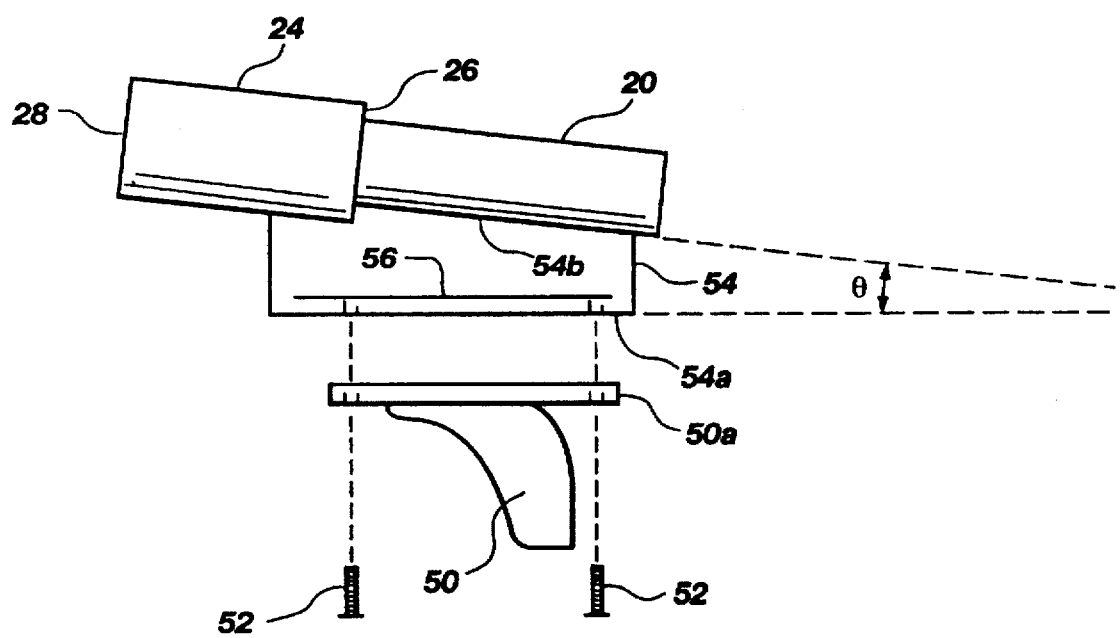
FIG. 5 is a side view of the casting apparatus of FIG. 4, shown in conjunction with a gripping handle.

Referring to FIG. 5, a hand-held gripping handle 50 may be used, wherein the positioning means comprises attachment means such as screws 52 and base member 54 for attaching the first hollow member 20 to the handle 50. The base member 54 includes a lower surface 54a configured for placement against a support member, such as support 50a of the handle 50. The base member 54 further includes an opposing upper surface 54b disposed on the first hollow member 20, wherein the upper surface 54b forms an angle θ with respect to the lower surface 54a. It will be appreciated that the angled upper surface 54b is useful to achieve a desired trajectory of the lure or bait 12 as it is launched through the air, and the base member 54 may configured to permit adjustable re-positioning of the upper surface 54b and angle θ if desired. The base member 54 may include a longitudinal slot 56 formed therein, and at least one clamping means 58 configured to extend into the slot 56 and around a support member such a fishing rod 19 for clamping the base member 54 to the rod 19. The clamping means 58 may comprise a circular clamp such as a hose clamp or the like. Alternatively, the attachment means may comprise first and second projections 44 and 46 extending outwardly from the first hollow member 24, configured for attaching to the fishing rod 19 in any suitable manner.

The open rear end 26 of the second hollow member 24 comprises side walls 60 having a perimeter end face 62 (shown most clearly in FIG. 2). The side walls 60 have a slot 64 formed in the perimeter end face 62, said slot being wider than, and disposed in axial alignment with, the attachment means (posts 46 and 44 in FIG. 2) so as to prevent interference contact between the attachment means and at least a rear section of the side walls 60 during telescopic sliding of the second hollow member 24 relative to the first hollow member 20.

Referring back to FIG. 1, optional line guide means, designated generally at 70, can be configured for coupling to the fishing rod 19 for retaining an end section 16a of the line 16 in substantial axial alignment with the open container 30. Preferably, the line guide means 70 comprises at least one guide member having gripping means 72 for releasably gripping the fishing rod 19 and first and second opposing prongs 74 extending outwardly from the gripping means 72 and laterally from the fishing rod 19 for retaining the end section 16a of the line therebetween.

Referring to FIG. 4, a grip 80 may be fixedly secured to the second hollow member 24 for permitting a user to grip the second hollow member and pull the second hollow member backwardly against the spring member. The grip 80 may comprise a rubber ring.

In accordance with the principles of the present invention expressed above and in the figures, a preferred method for casting a flexible line, such as fishing line, wherein said flexible line is disposed in a line source and includes an end, includes the steps of:

(a) telescopically inserting an open distal end of a first elongate hollow member into an open rear end of a second hollow member such that said hollow ends comprise telescopically overlapping sections;

(b) coupling an open container to the second hollow member (c) placing a spring force means within the telescopically overlapping sections for imposing a spring force against the second hollow member responsive to backward telescopic sliding of said second hollow member toward the first hollow member;

(d) placing the end of the flexible line in the open container;

(e) telescopically sliding the second hollow member backwardly toward the first hollow member against the spring force means; and (f) releasing the second hollow member so as to cause the spring force means to thrust and second hollow member forwardly and launch the flexible line therefrom.

It is noted that many of the advantages provided by the present invention accrue from the configuration of the spring member 32 extending through the telescopically overlapping sections 31 as shown in FIG. 3, such that all three separate elements of the spring member 32, first hollow member 20, and second hollow member 24 project simultaneously through the single plane 25. This novel combination enables the entire casting apparatus 10 to be smaller and more compact because the telescopically overlapping members 20 and 24 can "overlap" at least a portion of the spring member 32, such that the apparatus 10 requires less linear distance. This tri-axial overlap of the spring member 32 with the overlapping members 20 and 24 is more stable and secure than prior art casters. The tri-axial overlap of these closely concentric items operates to reinforce the assembly and hold it together better.

Additional advantages accrue from the interchangeability of the spring member 32 as enabled by the plates 40,42 and screws 38. Still other advantages are provided by the line guides 70 which keep the end section 16a of the flexible line 16 from becoming snagged or misaligned.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A casting apparatus for casting a flexible line, wherein said flexible line is disposed in a line feeding source and includes an end, said apparatus comprising:

a first, stationary elongate hollow member having an open distal end;

a second elongate hollow member having an open proximal end telescopically disposed around the open end of the first hollow member such that said hollow ends comprise telescopically overlapping sections and such that said second hollow member is telescopically slidable relative to said first hollow member forwardly and backwardly, respectively;

an open container disposed on the second hollow member for holding the end of the flexible line therein; and spring force means extending through the telescopically overlapping sections of the hollow members for thrusting the second hollow member forwardly and launching the end of the flexible line from the open container;

wherein said second hollow member circumscribes the first hollow member such that the second hollow member resides externally around said first hollow member and such that the open container resides externally of said first, stationary hollow member for any telescopic position of the second hollow member relative to said first hollow member.

2. The casting apparatus as defined in claim 1, wherein the first and second hollow members include first and second end walls, respectively, and wherein the spring force means comprises a spring member having a first end extending into the first hollow member into attachment with the first end wall and an opposing second end extending into the second hollow member into attachment with the second end wall.

3. The casting apparatus as defined in claim 2, further comprising spring coupling means for releasably attaching the first and second ends of the spring member to the first and second end walls, respectively, so as to enable the spring member to be interchangeable with other spring members.

4. The casting apparatus as defined in claim 1, wherein the spring force means comprises means for thrusting the second hollow member forwardly and stopping said second hollow member so as to impart kinetic energy to said flexible line in a manner sufficient to launch said flexible line from the open container.

5. The casting apparatus as defined in claim 1, further comprising positioning means for positioning the first and second hollow members at a lateral location relative to the line feeding source.

6. The casting apparatus as defined in claim 5, further comprising a hand-held gripping handle, wherein the positioning means comprises attachment means for attaching the first hollow member to the hand-held gripping handle.

7. The casting apparatus as defined in claim 5, wherein the attachment means comprises first and second projections extending outwardly from the first hollow member.

8. The casting apparatus as defined in claim 5, wherein the positioning means comprises a base member having a lower surface configured for placement against a support member and an opposing upper surface disposed on the first hollow member, wherein said upper surface forms an angle with respect to the lower surface.

9. The casting apparatus as defined in claim 5, wherein the positioning means further comprises:

a base member having a longitudinal slot formed therein; and at least one clamping means configured to extend into the slot and around a support member for clamping the base member to said support member.

10. The casting apparatus as defined in claim 5, wherein the positioning means comprises attachment means coupled to the first hollow member for attaching said first hollow member to a support member, and wherein the open proximal end of the second hollow member comprises side walls having a perimeter end face, said side walls having a slot formed in the perimeter end face, said slot being wider than, and disposed in axial alignment with, the attachment means so as to prevent interference contact between the attachment means and at least a proximal section of the side walls during telescopic sliding of the second hollow member relative to the first hollow member.

11. The casting apparatus as defined in claim 5, wherein the positioning means comprises attachment means for attaching the first hollow member to a base end of a fishing rod, said casting apparatus further comprising line guide means configured to be coupled to the fishing rod for retaining an end section of the line in substantial axial alignment with the open container.

12. The casting apparatus as defined in claim 11, wherein the line guide means comprises at least one guide member having gripping means for releasably gripping the fishing rod and first and second opposing prongs extending outwardly from the gripping means and laterally from the fishing rod for retaining the end section of the line therebetween.

13. The casting apparatus as defined in claim 1, further comprising a grip fixedly secured to the second hollow member for permitting a user to grip said second hollow member for pulling said second hollow member backwardly against the spring force means.

14. The casting apparatus as defined in claim 1, wherein the second hollow member and the open container collectively comprise a hollow outer tube having first and second open ends and wherein the first hollow member comprises a hollow inner tube telescopically disposed within the first open end of the outer tube such that said inner and outer tubes are slidable relative to one another.

15. The casting apparatus as defined in claim 1, wherein at least a portion of the spring force means and a portion of each of the first and second hollow members project simultaneously through a single plane extending laterally through said hollow members.

16. A casting apparatus for casting a flexible line, wherein said flexible line is disposed in a line source and includes an end, said apparatus comprising:

an elongate, stationary hollow support member having an open distal end;

an elongate hollow reciprocating member being open at opposing ends thereof and having a contact plate disposed therein for dividing said reciprocating member into a sleeve portion and an opposing open container portion for holding the end of the flexible line therein, said sleeve portion being telescopically disposed around the open distal end of the support member to form telescopically overlapping sections such that said sleeve member is telescopically slidable relative to said support member forwardly and backwardly, respectively, said sleeve member circumscribing the support member such that the reciprocating member resides externally around said support member and such that the contact plate resides externally of said support member for any telescopic position of the reciprocating member relative to said support member; and spring force means extending through the telescopically overlapping sections of the sleeve member and support member for thrusting the sleeve member and contact plate forwardly and launching the end of the flexible line from the open container portion.

17. The casting apparatus as defined in claim 16, wherein the line source comprises a fishing rod and reel combination with the reel attached to the rod, said casting apparatus further comprising:

attachment means attachable to the rod so as to extend laterally outward therefrom for attaching the hollow support member and the hollow reciprocating member to said rod such that said support member and said reciprocating member reside at a lateral, remote location relative to the fishing rod and reel combination.

18. The casting apparatus as defined in claim 16, further comprising:

positioning means for positioning the hollow support member and the hollow reciprocating member at a lateral location relative to the line source; and a hand-held gripping handle, wherein the positioning means comprises attachment means for attaching the hollow support member to the hand-held gripping handle.

19. The casting apparatus as defined in claim 16, further comprising:

positioning means for positioning the hollow support member and the hollow reciprocating member at a lateral location relative to the line source;

wherein the hollow support member comprises a first support member and the positioning means comprises a base member having a lower surface configured for placement against a second support member and an opposing upper surface disposed on the hollow support member, wherein said upper surface forms an angle with respect to the lower surface.

20. The casting apparatus of claim 16, wherein the line source comprises a fishing rod and reel and wherein the hollow reciprocating member further includes a guide slot formed therein, said casting apparatus further comprising:

at least one attachment means disposed on the hollow support member and extending outwardly therefrom for (i) attaching said support member to the fishing rod, and (ii) extending through the guide slot of the reciprocating member for at least some positions of said reciprocating member to thereby guide movement of said reciprocating member.

21. The casting apparatus of claim 20, wherein the reciprocating member defines a central axis and wherein the attachment means and the guide slot are disposed in a parallel alignment with respect to said central axis to thereby inhibit rotational movement of said reciprocating member with respect to the hollow support member.

22. The casting apparatus of claim 16, wherein the line source comprises a fishing rod and reel and wherein line guide means comprises at least one guide member having gripping means for releasably gripping the fishing rod and first and second opposing prongs extending both outwardly from the gripping means and laterally from the fishing rod for retaining an end section of the flexible line therebetween.

23. The casting apparatus of claim 22, wherein the line source comprises a fishing rod and reel and wherein the first and second opposing prongs terminate in first and second unconnected free ends extending outwardly from said fishing rod.

24. A method for casting a flexible line, wherein said flexible line is disposed in a line source and includes an end, said method comprising the steps of:

(a) telescopically inserting an open distal end of a first elongate hollow member into an open proximal end of a second hollow member such that said hollow ends comprise telescopically overlapping sections;

(b) coupling an open container to the second hollow member (c) placing a spring force means within the telescopically overlapping sections for imposing a spring force against the second hollow member responsive to backward telescopic sliding of said second hollow member toward the first hollow member;

(d) securing the first hollow member and the second hollow member to a hand-held gripping handle that remains unattached to the line source and thereby independently moveable with respect to said line source;

(e) placing the end of the flexible line in the open container;

(f) telescopically sliding the second hollow member backwardly toward the first hollow member against the spring force means; and (g) releasing the second hollow member so as to cause the spring force means to thrust the second hollow member forwardly and launch the flexible line therefrom.

* * * * *